Figure 1:
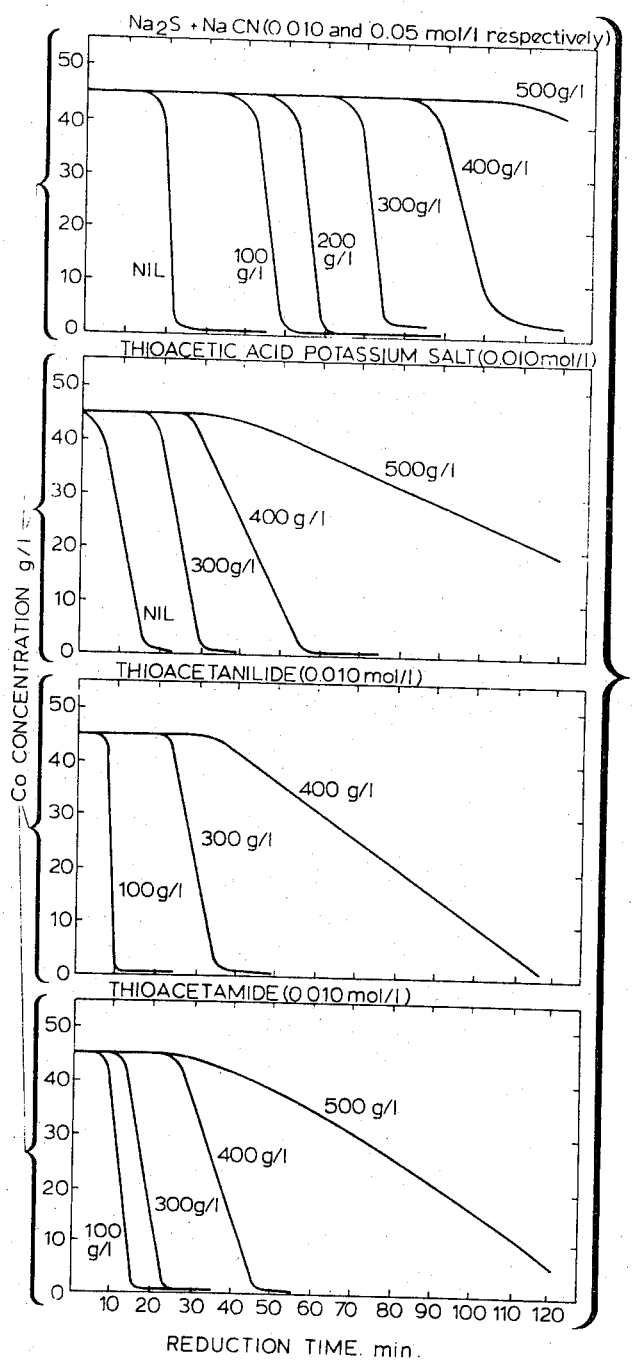

United States Patent [19]
Kunda et al.

[11] 3,775,098
[45] Nov. 27, 1973

[54] COBALT PRECIPITATION FROM AQUEOUS SOLUTIONS

[75] Inventors: Wasyl Kunda, Edmonton, Alberta; Roderick Herbert Hitesman, Saskatchewan, Alberta, both of Canada

[73] Assignee: Sherritt Gordon Mines Limited, West Toronto, Ontario, Canada

[22] Filed: Dec. 27, 1971

[21] Appl. No.: 212,419

[52] U.S. Cl............... 75/108, 75/0.5 A, 75/0.5 AA, 75/119
[51] Int. Cl............................................. C22b 3/00
[58] Field of Search................. 75/108, 119, 0.5 A, 75/0.5 AA, 0.5 AB

[56] References Cited
UNITED STATES PATENTS

| | | | |
|---|---|---|---|
| 2,767,081 | 10/1956 | Mackin et al.......................... | 75/108 |
| 2,767,082 | 10/1956 | Roy et al. ............................. | 75/108 |
| 2,767,083 | 10/1956 | Mackin et al.......................... | 75/108 |
| 2,853,403 | 9/1958 | Mackin et al..................... | 75/108 X |
| 3,694,185 | 9/1972 | Kunda et al..................... | 75/0.5 AA |

FOREIGN PATENTS OR APPLICATIONS

| | | | |
|---|---|---|---|
| 580,508 | 7/1959 | Canada................................ | 75/108 |

*Primary Examiner*—Herbert T. Carter
*Attorney*—Frank I. Piper et al.

[57] ABSTRACT

Cobalt nuclei is formed in an aqueous ammoniacal solution which contains in addition to dissolved salts of cobalt, ammonium sulphate in concentrations up to about 500 grams per litre. The nuclei are formed by providing in the solution at least 0.001 mole per litre of an organic catalyst composed of compounds of the general formula

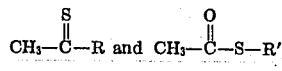

wherein R is $NH_2$ or $NH-C_xH_{x-1}$, $x$ being from 2 to 10 and R' is an alkali metal. The solution is reacted with hydrogen at elevated temperature and pressure to cause dissolved cobalt values to precipitate as discrete elemental powder which is useful as seed for subsequent densification. Optionally in addition to the organic catalyst, an organic promoter composed of gum arabic, dextrin, dextrose, alizarin and "Separan" may be provided in the solution.

6 Claims, 2 Drawing Figures

EFFECT OF AMMONIUM SULPHATE CONCENTRATION ON THE RATE OF COBALT REDUCTION WITH VARIOUS CATALYSTS.

EFFECT OF PROMOTERS ON THE RATE OF COBALT REDUCTION FROM COBALT AMMINE SULPHATE SOLUTION WITH 0.02 mol/l THIOACETAMIDE CATALYST.

COBALT PRECIPITATION FROM AQUEOUS SOLUTIONS

This invention relates to the precipitation of cobalt metal from aqueous solutions containing dissolved cobalt salts by the action of reducing gas at elevated temperature and pressure. More particularly, the invention relates to the use of novel nucleation catalysts which initiate the direct hydrogen reduction of metallic cobalt from such solutions.

In recent years, nickel, cobalt and copper powders have been produced on a commercial scale by reacting aqueous solutions containing dissolved salts of the metals with a reducing gas such as hydrogen at super-atmospheric pressure and elevated temperature. Such solutions may be derived from the hydrometallurgical treatment of nickel, cobalt and copper containing ores, concentrates or other source material such as mattes, metal scrap, residues and the like materials. The reduction operation is usually conducted at a temperature in the range of 120° to 290°C. under a partial pressure of hydrogen in the range of 28 to 56 Kg per cm$^2$.

In the commercial production of metals by this method, there are two basic stages in the reduction process: an initial "nucleation" stage followed by a later "densification" stage. In the nucleation stage, reduction is initiated and fine metal particles or nuclei are formed in the solution. In the densification stage, metal precipitates from solution onto preformed "seed" particles which are present in the solution. The metal particles which are formed during the densification stage have a greater apparent density than can be obtained in the nucleation stage. The densification stage usually includes a large number of separate reduction cycles with the fine metal particles or nuclei precipitated during the nucleation stage functioning as seed for the first densification cycle and the densified powder particles of the first densification cycle functioning as seed for the next cycle and so on until the desired number of reduction cycles have been conducted.

In order to initiate the formation of the metal particles during the nucleation stage, a nucleation catalyst must be added to the aqueous metal salt-containing solution. Compounds known to be particularly effective for the purpose of initiating formation of cobalt nuclei include sodium sulfide, ammonium sulphide and a mixture of sodium sulphide and sodium cyanide.

Cobalt-containing ammoniacal solutions derived from known hydrometallurgical methods the recovery of cobalt values from cobalt bearing material often contain, in addition to dissolved salts of cobalt, up to 500 grams per litre ammonium sulphate. Ammonium sulphate in such a high concentration severely interferes with the effectiveness of the above-mentioned nucleation catalysts. The period of time which elapses from the time conditions for reduction are imposed to the time of formation of a significant number of cobalt nuclei (hereinafter referred to as the "induction period") is markedly longer at ammonium sulphate concentrations in excess of b 200 grams per litre than at lower concentrations. Furthermore, the rate of reduction during the nucleation stage is retarded by high ammonium sulphate concentrations.

Because of the problems caused by high ammonium sulphate concentrations, nucleation is in practice not carried out in the cobalt-containing ammoniacal solution. Nucleation is carried out in a special solution prepared by dissolving cobalt powder in sulphuric acid. The cobalt nuclei formed in the special solution during reduction are added to the ammonium sulphate-containing solution and serve as the seed onto which dissolved cobalt values precipitate during the densification stage. The cost incurred in the preparation of the special nucleation solution and in the separation of the cobalt nuclei from the solution has a significant effect on the economics of the reduction operation.

It has been found that nucleation can be carried out on solutions which contain, in addition to dissolved cobalt, as high as 500 grams per litre ammonium sulphate provided the solution also contains an organic catalyst of the general formula:

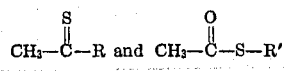

wherein R is NH$_2$—C$_x$H$_{x-1}$, $x$ being from 2 to 10 and R' is an alkali metal. Typical compounds having this general formula are thioacetamide, thioacetanilide, and thioacetic acid potassium salt. The organic catalysts have the effect of substantially diminishing the induction period as well as increasing the rate of reduction during the nucleation stage. A still further decrease in the induction period can be obtained by adding to the cobalt-containing solution, in addition to the organic catalysts, certain organic promoters. Organic promoters effective for this purpose are composed of gum arabic, dextrin, dextrose, alizarin and "Separan" (a trade mark of Dow Chemical Company covering a substance identified as high molecular weight acrylamide polymer hydrolytes having from 0.8 percent to about 10 percent of the amide groups of the polymer replaced by carboxyl groups and characterized by a viscosity of at least 4 centipoises from an aqueous 0.5 percent by weight solution of the polymer hydrolyte). Such organic promoters also have the effect of increasing the reduction rate during the nucleation stage.

While the organic catalysts of the invention are useful to facilitate nucleation of ammoniacal solutions having lower ammonium sulphate concentrations, it is often only economical to use the catalysts in solutions containing too high a concentration of ammonium sulphate for effective nucleation using conventional catalysts. Accordingly, use of the organic catalysts of the invention will normally be confined to solutions containing ammonium sulphate in concentrations within the range of 200 and 500 grams per litre.

In its broadest aspect, the present invention may be characterized as an improvement to the known process of recovering cobalt as a discrete elemental metal powder from an aqueous ammoniacal solution by reaction with hydrogen at a super-atmospheric pressure and elevated temperature. The improvement of the invention involves providing in the cobalt salt solution at least about 0.001 mole per litre of an organic catalyst of the general formula:

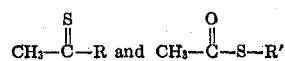

wherein R is NH$_2$ or NH — C$_x$H$_{x-1}$, $x$ being from 2 to 10 and R' is an alkali metal.

Figure 2:
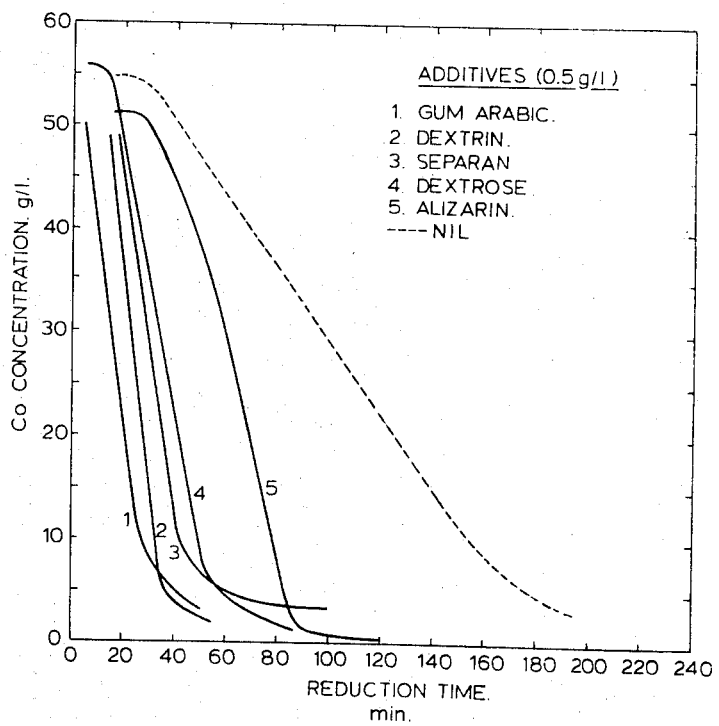

The invention is described in detail with reference to the accompanying drawings in which:

FIG. 1 is a graph showing the effect of ammonium sulphate concentration on the rate of cobalt reduction using various organic catalysts; and FIG. 2 is another graph showing the effect of organic promoters on the rate of cobalt reduction from a solution containing a dissolved cobalt salt and thioacetamide catalyst.

The starting solution to be treated may be any aqueous ammoniacal solution having cobalt values dissolved therein. The solution may contain ammonium sulphate in any concentration up to 500 grams per litre. While solutions having considerably lower ammonium sulphate concentrations may be treated by the process of the subject invention, it is generally more economic to treat solutions having concentrations below about 200 grams per litre ammonium sulphate using known catalysts such as sodium sulphide, ammonium sulphide and mixtures of sodium sulphide and sodium cyanide.

In commercial practice, the solution may be derived from the hydrometallurgical treatment of cobalt and nickel-containing sulphide ores or oxide ores. The solution may also be derived from the treatment of scrap metal, mattes, residues or plant by-product by a suitable hydrometallurgical process.

In accordance with the invention, reduction of the cobalt values in solution are brought about by the addition of an organic compound having the general formula:

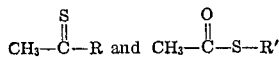

wherein R is $NH_2$ or $NH - C_xH_{x-1}$, $x$ being from 2 to 10 and R' is an alkali metal. Typical compounds having such a general formula are thioacetamide ($CH_3 - C(:S) - NH_2$) thioacetanilide ($CH_3 - C(:S) - NH - C_6H_5$), and thioacetic acid potassium salt ($CH_3 - C - OSK$). Compounds having such a general formula are hereinafter referred to as the "organic catalysts."

The amount of the organic catalyst required to cause nucleation can be as little as 0.001 mole organic catalyst per litre solution. In most cases, optimum results are obtained with additions of between 0.1 and 0.001 mole per litre. Greater amounts of organic catalyst can be added to solution but the induction period before nucleation and the rate of reduction is not significantly affected by such amounts. Moreover, the precipitated cobalt produced may be contaminated beyond market specification by the catalyst where excessive amounts are added to solution. Where less than 0.001 mole per litre of organic catalyst is added to solution, the induction period becomes unduly long and in fact, reduction of cobalt may not take place at all.

In general, thioacetamide is the most effective nucleation catalyst for solutions which contain about 500 grams per litre ammonium sulphate. In solutions which contain a somewhat lower ammonium sulphate concentration, such organic catalysts as thioacetic acid, potassium salt and thioacetanilide act as satisfactory nucleators. These latter catalysts are, however, somewhat less effective than thioacetamide in solutions having an ammonium sulphate concentration in excess of 400 grams per litre.

The molar ratio of free ammonia to dissolved cobalt in the ammoniacal solution has an important effect on the efficiency of reduction of the cobalt values. It is generally desirable to maintain a molar ratio of free ammonia to cobalt within the range of 2 to 3. Reduction of cobalt values from the solution in which the free ammonia to cobalt molar ratio is outside the range of 2 to 3 is incomplete and a large proportion of the cobalt values remains dissolved in solution. By contrast, the efficiency of reduction of cobalt values is much improved when the free ammonia to cobalt molar ratio is adjusted within the range of 2 to 3. Preferably, the ratio is adjusted to 2.3.

Nucleation and densification are carried out using a suitable reducing gas such as hydrogen. The operations are carried out at a temperature above about 90°C. usually between 120° and 200°C. The minimum pressure required for reduction is about 7 $Kg/cm^2$. At lower pressure the rate of reduction is too slow for most commercial processes. The highest recommended pressure for reduction is about 30 $Kg/cm^2$. Higher pressures should be avoided as placing an unnecessary restriction on the apparatus requirements. For the same reasons, unnecessarily high temperatures should be avoided as requiring excessive pressures.

Certain other organic compounds when used in combination with the organic catalysts of the invention, have the effect of significantly shortening the induction period. Furthermore, these compounds, which are referred to herein as "organic promoters", serve to materially increase the rate of reduction of cobalt salt to metallic cobalt. Such agents comprise gum arabic, dextrin, dextrose, alizarin and "Separan".

In general, the addition of up to about 0.5 gram per litre organic promoter is effective for the stated purpose. The addition of larger amounts may result in undesirable contamination of the cobalt product.

The following examples further demonstrate the method of the invention. The examples are meant to be illustrative of the invention and are not included herein for purposes of limitation.

EXAMPLE 1

An aqueous starting solution containing 75 grams per litre cobalt in the form of soluble cobalt ammine sulphate, 53 grams per litre free ammonia ($NH_3$/Co molar ratio 2.3/1) was divided into four portions. To one portion was added a conventional nucleation catalyst: a mixture of sodium sulphide and sodium cyanide in the amount of 0.01 and 0.05 moles per litre respectively. Thioacetic acid potassium salt, thioacetanilide and thioacetamide in the amount of 0.010 mole per litre were added to the remaining three portions. Each portion in turn was further divided and ammonium sulphate in varying amounts was added to each.

The test solutions were heated to 177°C. in an autoclave under a hydrogen over-pressure of 31 Kg. per $cm^2$. The cobalt concentration of the solution after first contact with hydrogen was monitored for 2 hours. The results are illustrated in FIG. 1.

The results show that thioacetamide is marginally more effective than thioacetic acid potassium salt and significantly more effective than either thioacetanilide or sodium sulphide-sodium cyanide. When the reduction is extended to 100 minutes, the cobalt concentration of the thioacetamide-containing solution decreases to 18 grams per litre and after 120 minutes 8 grams per litre while the thioacetic acid potassium salt-containing solution decreases to 28 grams per litre after 100 minutes and 19 grams per litre after 120 minutes. For longer reduction periods therefore, thioacetamide is the most effective nucleation catalyst.

EXAMPLE 2

This example illustrates the further improvements to be had by the addition of organic promoters to an ammonium sulphate containing solution in which thioacetamide is used as a nucleation catalyst. The starting solution contains 60 grams per litre cobalt in the form of cobalt ammine sulphate, 40 grams per litre free ammonia, 490 grams per litre ammonium sulphate and 0.02 mole per litre thioacetamide. The solution was divided into six portions and to five portions was added a different organic promoter in the amount of 0.5 gram per litre. Each portion was charged into an autoclave heated to 177°C. and subjected to a hydrogen partial pressure of 31 Kg. per $cm^2$. The charges were continuously agitated during the test and the cobalt concentration of the solutions after first contact with hydrogen were monitored over a period of time. The results are illustrated in FIG. 2.

FIG. 2 shows that the addition of 0.5 organic promoter to the solutions gives rise to very beneficial effects. Not only is the induction period shortened but the rate of reduction of cobalt is increased from 2 to 5 times.

What we claim as new and desire to protect by letters Patent of the United States is:

1. In a process for recovering cobalt as a discrete elemental metal powder from an aqueous ammoniacal solution containing in addition to dissolved salts of cobalt, ammonium sulphate in a concentration within the range of about 200 to about 500 grams per litre by reacting such solution with hydrogen at superatmospheric pressure and elevated temperature, the improvement in combination therewith of rapidly inducing reduction to and formation of cobalt nuclei which comprises: providing in said solution at least about 0.001 mole per litre of an organic catalyst chosen from the group comprising thioacetamide, thioacetanilide and thioacetic acid alkali metal salt.

2. The improved process as claimed in claim 1 wherein said organic catalyst is provided in an amount within the range 0.1 to 0.001 mole per litre.

3. The improved process as claimed in claim 1 wherein an organic promoter is provided in said solution, said organic promoter being chosen from the group comprising: gum arabic, dextrin, dextrose, alizarin and acrylamide polymer hydrolyte.

4. The process as claimed in claim 3 wherein up to about 0.5 gram per litre of said organic promoter is provided in said solution.

5. In recovering cobalt as a discrete elemental metal powder from an aqueous ammoniacal solution containing dissolved salts of cobalt, the molar ratio of free ammonia to cobalt being in the range of 2 to 3, said solution further containing ammonium sulphate in a concentration within the range of about 200 to about 500 grams per litre, said process including treating such ammoniacal solution with hydrogen at a pressure within the range of 7 to 30 $Kg/cm^2$ and at a temperature within the range of 120° and 200°C, the improvement in combination therewith of rapidly inducing reduction to and formation of cobalt nuclei which comprises: providing in said solution, in an amount within the range 0.1 to 0.001 mole per litre, an organic catalyst chosen from the group comprising thioacetamide, thioacetanilide and thioacetic acid potassium salt.

6. The process as claimed in claim 5 wherein up to about 0.5 gram per litre of an organic promoter is provided in said solution, said organic promoter being chosen from the group comprising: gum arabic, dextrin, dextrose, alizarin and acrylamide polymer hydrolyte.

* * * * *